United States Patent [19]
Anderson, Jr.

[11] Patent Number: 5,220,982
[45] Date of Patent: Jun. 22, 1993

[54] DAMPENER
[75] Inventor: Henry M. Anderson, Jr., Belding, Mich.
[73] Assignee: Hadley Products, Grandville, Mich.
[21] Appl. No.: 805,209
[22] Filed: Dec. 9, 1991

Related U.S. Application Data

[62] Division of Ser. No. 711,450, Jun. 6, 1991, Pat. No. 5,161,579.

[51] Int. Cl.[5] .................... F16F 9/00; B60T 8/18
[52] U.S. Cl. ........................... 188/266; 188/195; 188/316; 188/378; 267/64.16
[58] Field of Search ............... 267/64.16, 64.17, 64.19, 267/64.28; 188/267, 268, 316, 317, 322.15, 322.22, 378, 379, 380

[56] References Cited

U.S. PATENT DOCUMENTS

| | | | |
|---|---|---|---|
| 2,713,401 | 7/1955 | Seuste et al. | 188/316 |
| 2,838,300 | 6/1958 | Gray | 188/316 |
| 2,942,623 | 6/1960 | Schwartz | 137/627.5 |
| 2,953,810 | 9/1960 | Hall | 188/317 |
| 3,006,657 | 10/1961 | Augustin | 280/124 |
| 3,071,393 | 1/1963 | Valentine | 280/124 |
| 3,266,603 | 8/1966 | Kamimoto | 188/316 |
| 3,442,502 | 5/1969 | Fischer et al. | 267/65 |
| 3,560,017 | 2/1971 | Vogel et al. | 280/124 |
| 3,635,460 | 1/1972 | Shilton et al. | 267/65 |
| 3,716,251 | 2/1973 | Klees | 267/64.16 |
| 3,889,935 | 6/1975 | Palm et al. | 267/65 |
| 4,271,935 | 6/1981 | Pelat et al. | 188/380 |
| 4,351,515 | 9/1982 | Yoshida | 188/380 |
| 4,453,736 | 6/1984 | Bergemann et al. | 280/711 |
| 4,735,402 | 4/1988 | Davis | 188/322.22 |
| 4,886,092 | 12/1989 | Barzelay | 137/627.5 |
| 5,076,403 | 12/1991 | Mitsui | 188/378 |

FOREIGN PATENT DOCUMENTS 1261192 4/1961 France .................... 188/379

Primary Examiner—Matthew C. Graham
Assistant Examiner—Chris Schwartz
Attorney, Agent, or Firm—Price, Heneveld, Cooper, DeWitt & Litton

[57] ABSTRACT

A dampener for devices such as a leveling valve in which the dampener is a separate self-contained member formed of a piston cylinder part and a cap connected to each other and having a piston mounted in the chamber between the parts. The cylinder chamber occupied by the piston contains a viscous fluid that passes over the edge of the periphery of the inner wall of the chamber as the piston is moved from one end to the other. The two parts of the dampener are preferably constructed of transparent material so that it can be determined whether the space between the piston and the walls of the chamber is completely filled with a viscous fluid or whether there are any air bubbles or the like in the chamber. A temporary opening is provided in the cylinder cap for escape of air when the two parts are connected together. Extending from both sides of the piston are hubs exposed to the exterior of the dampener. A plunger extends through a bore in the piston and the hubs, the piston being interconnected to the plunger by a stop means extending radially from the plunger. The hubs are provided so that coil springs circumventing the plunger can be utilized for containing the plunger in a neutral position. The total plunger movement is limited by the distance of the travel within the dampener.

13 Claims, 4 Drawing Sheets

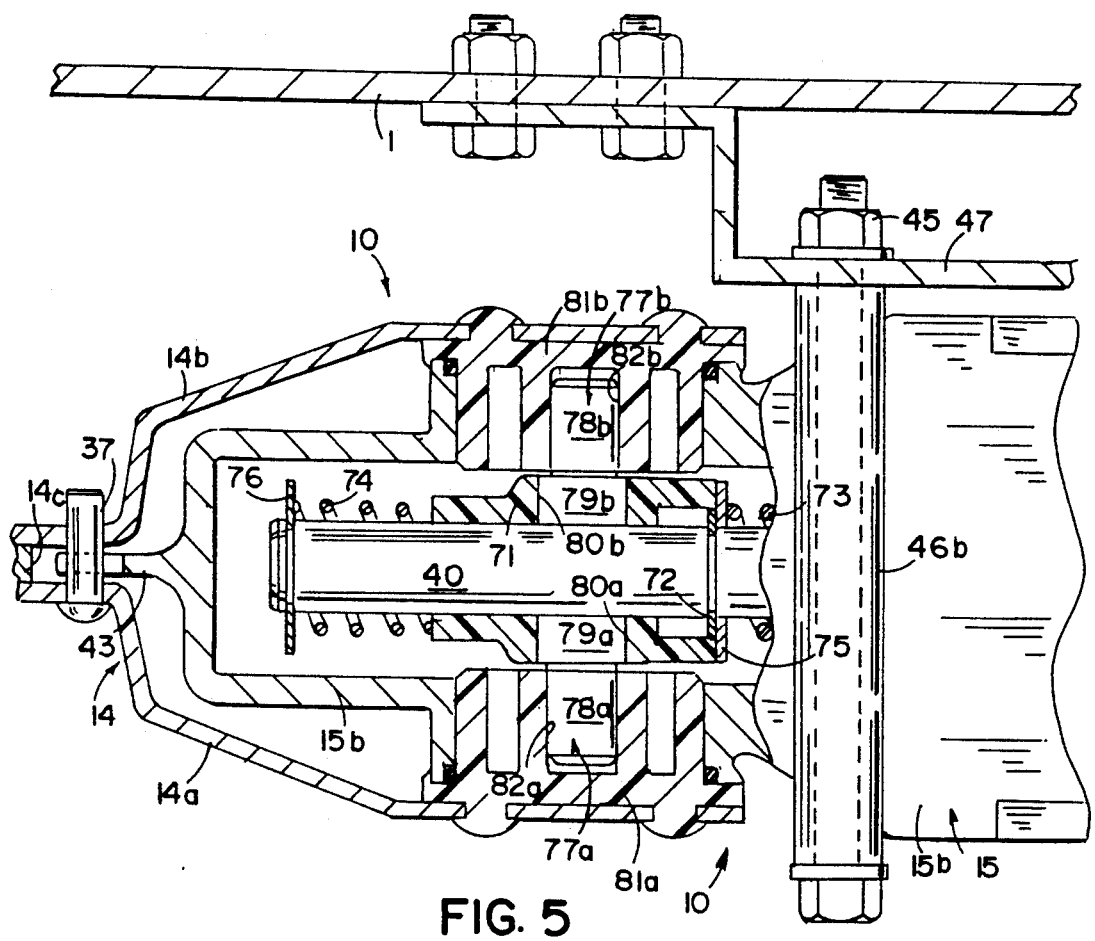
FIG. 5
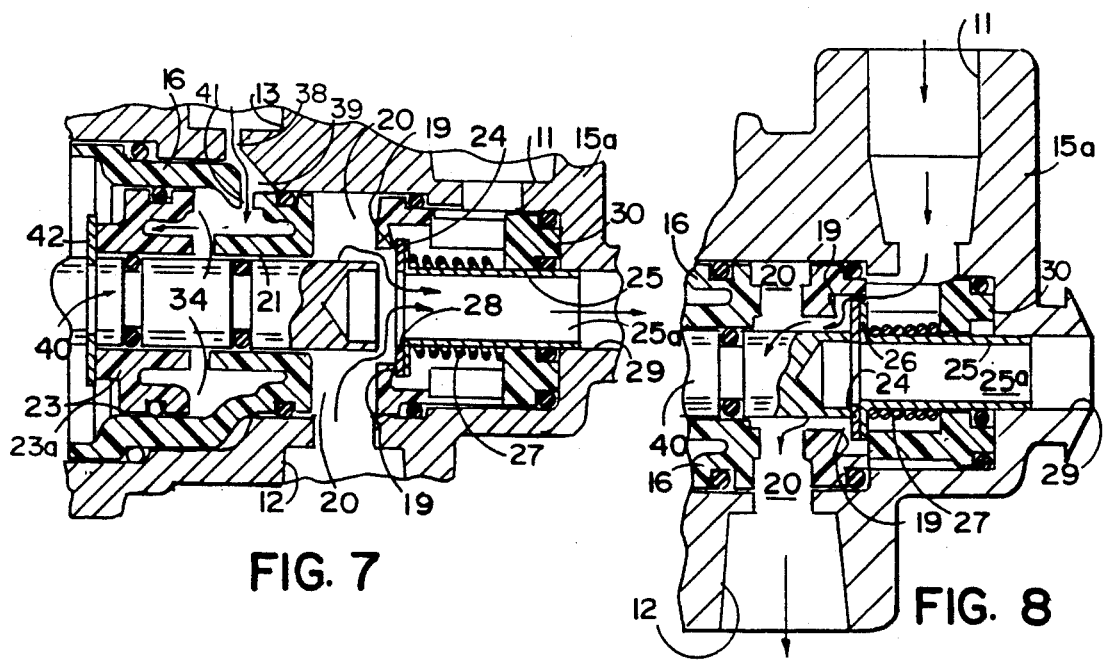
FIG. 7
FIG. 8

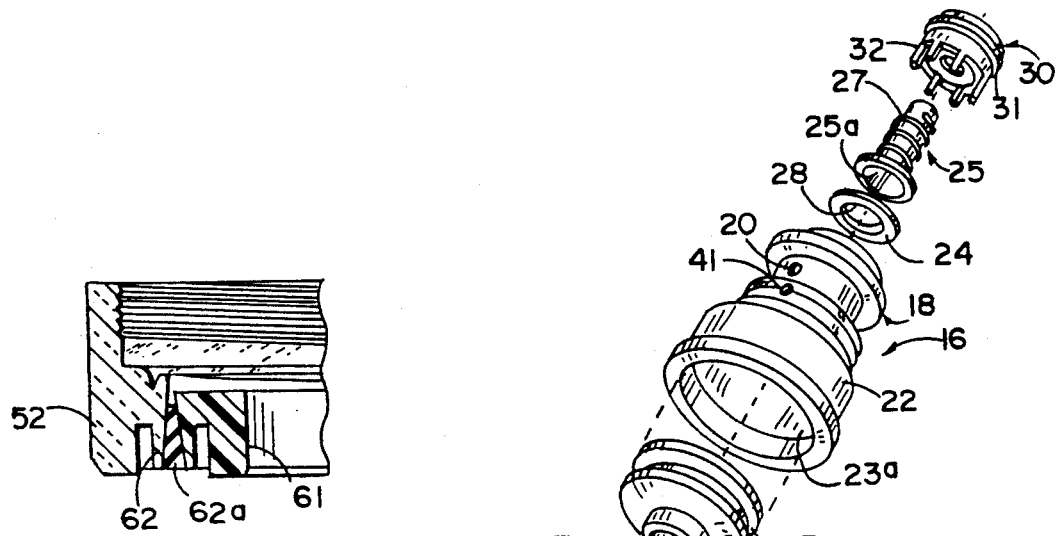
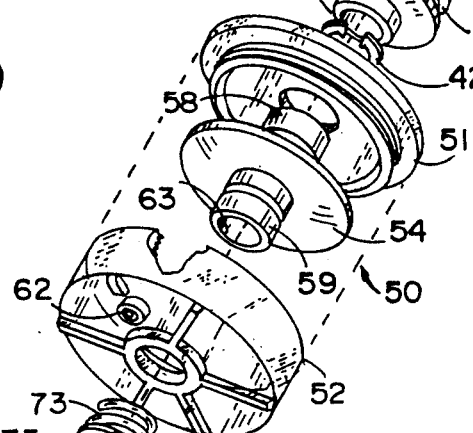
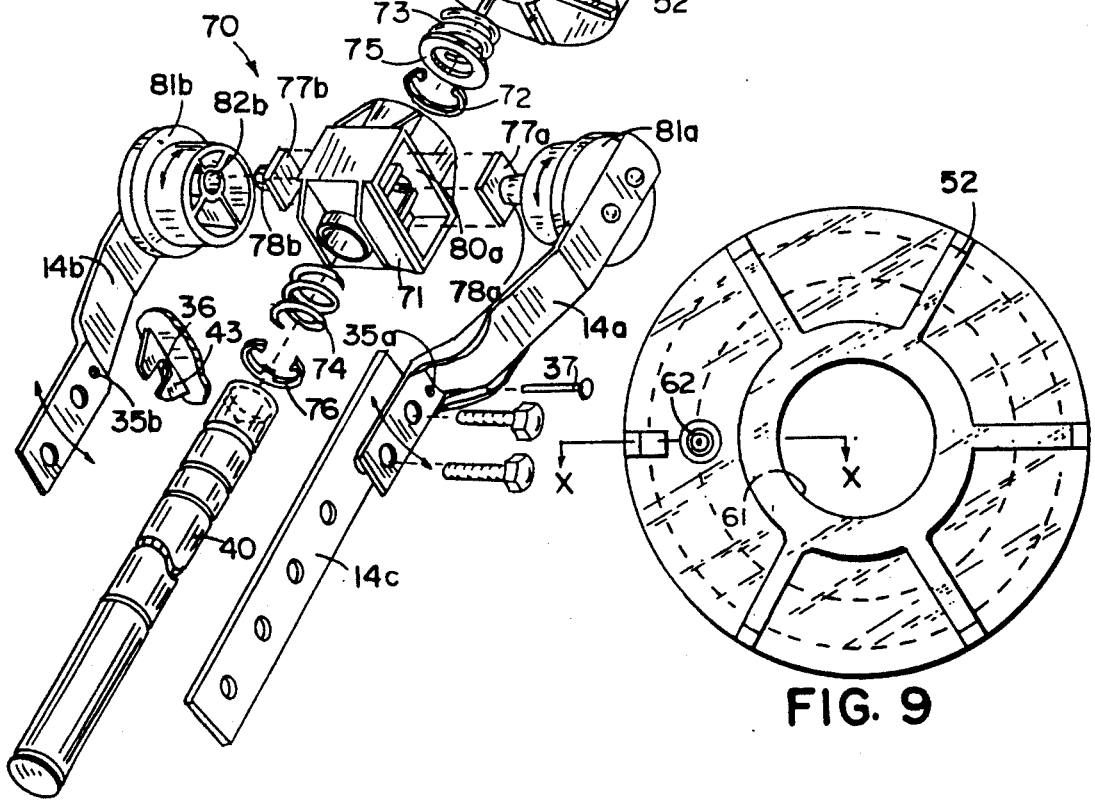
FIG. 10
FIG. 6
FIG. 9

DAMPENER

This is a division of application Ser. No. 07/711,450, filed Jun. 6, 1991, now U.S. Pat. No. 5,161,579 issued Nov. 10, 1992.

BACKGROUND OF THE INVENTION

This invention relates to a leveling valve for controlling the amount of air within an air spring mounted between two members at least one of which is movable relative to the other. The leveling valve of this invention controls the air pressure in the air spring in response to changes in the distance between two such members. This leveling valve has its greatest use in maintaining a constant level of a vehicle chassis or frame relative to its axles in response to the loading and unloading of the vehicle.

Leveling valves per se are not new and have been used in the vehicle industry for a number of years such as disclosed in the U.S. Pat. Nos. 2,942,623 to Schwartz, 3,071,393 to Valentine, and 4,886,092 to Barzelay. Prior art leveling valves have had several problems and disadvantages. One of these problems is an over-travel problem resulting from the mechanism which actuates the valve in response to changes in distance between two members. Yet another problem is the lack of any dampening device built into the leveling valve. Frequently, such dampening devices are units separated from the leveling valve itself. In those attempts to incorporate a dampening device in the valve, the mechanism has been extremely complicated as evidenced by U.S. Pat. No. 2,942,623 issued to Schwartz. Another problem is the lack of any limit to the valve part movement thus creating excessive seal wear in the valve. An additional problem is small passages or orifices in the valve as dictated by previous designs.

To my knowledge, there have been no effective dump features built into a leveling valve which can override the valve mechanism that controls the valve in response to the changes in the distance between two members. Prior devices also have been extremely complicated and expensive because of the large number of parts and the machining required on those parts. In addition, assembly costs of most leveling valves have been excessive resulting in a high cost to produce the valves.

SUMMARY OF THE INVENTION

The leveling valve of this invention has been designed to eliminate most, if not all, of the above problems that have been experienced in leveling valves of this type. The present invention incorporates in one body the actuating mechanism, a dampener, a valve means actuated by the actuating mechanism, an over-travel mechanism, and a pilot-operated dump means for dumping the air from the air spring through the valve. This feature is accomplished by providing a leveling valve comprised of an elongated body having an air inlet port, an air outlet delivery port and an air outlet exhaust port at one of its ends. The inlet port is adapted to be connected to a source of air pressure and the delivery port is adapted to be connected to at least one air spring. The valve means is located at the same end as the ports for either providing communication between the inlet and delivery ports or the delivery and exhaust ports or for closing off all communications between all of the ports. An elongated actuator comprising a plunger extends essentially the entire length of the elongated body to the valve means. The actuating mechanism for actuating the plunger is located at the end of the plunger opposite the valve means. An over-travel mechanism is provided to allow a dampener, which is located in the body between the valve means and the actuating mechanism to provide a desired travel time in the operation of the valve means. The plunger extends through the dampening means and is operatively connected thereto. The dampener minimizes undesirable fluctuations in the actuation of the valve means caused by large bumps, and the like, in the roads.

A unique feature of this invention is the over-travel actuating mechanism which includes a valve travel limit and an over-travel means which provides for takeup of the over-travel of the valve actuating mechanism. This is accomplished by a sliding sleeve located about a plunger between the two coil springs, previously described, and actuated by two rotatable eccentric means mounted on the elongated valve body, one on each side of the sleeve. The springs permit the sleeve to slide when the plunger reaches its limit of travel. The sleeve has recessed means for receiving the eccentric means whereby rotation of the eccentric means moves the sleeve longitudinally of the elongated body. A forked actuator arm having a first arm connected to the rotatable eccentric means located on one side of the sleeve and a second arm connected to the rotatable eccentric means located on the other side of the sleeve are provided. These two arm portions are connected to a third arm portion adapted to be connected to a means which pivots the arm and rotates the eccentric means in response to changes in distance between two members between which an air spring is mounted.

A means is provided between the actuating means and the valve means for quickly dumping the air from the air springs through an exhaust port, This is accomplished by providing a dump piston located in a piston cylinder that is in communication with a dump pilot port. The dump piston is actuated by subjecting it to air pressure introduced through the dump pilot port causing it to engage a snap-ring on the plunger to open the valve means and provide communication between the delivery port and the exhaust port so that the air in the air bag is dumped or exhausted through the exhaust port. This is made possible by the compression of the coil springs of the over-travel mechanism.

Another unique and novel feature of this invention is the construction of the dampener which is a separate self-contained member formed of a piston cylinder part and a cap connected to each other and having a piston mounted in the chamber between the parts. The portion of the cylinder chamber unoccupied by the piston contains a viscous fluid that passes over the edge of the periphery of the inner wall of the chamber as the piston is moved with the plunger using the force of over-travel springs. The two parts of the dampener are preferably constructed of transparent material so that after the two parts have been connected together, with the piston in between, it can be determined whether the space between the piston and the walls of the chamber is completely filled with viscous fluid. A temporary opening is provided in the cylinder cap for the escape of air when the two parts are connected together. The transparent parts also permit viewing therethrough to determine whether there are any air bubbles, or the like.

Extending from both sides of the piston are hubs exposed to the exterior of the dampener. The plunger extends through a bore in the piston and the hubs. The piston is interconnected to the plunger by a stop means extending radially from the plunger and located between the dampener and the valve means. On the other side of the dampener, the plunger is interconnected to the piston by a coil spring circumventing the plunger and extending between one of the hubs of the piston and the plunger actuating mechanism. Another coil spring is mounted between a stop member on the end of the plunger and the plunger actuating mechanism. Thus, this valve has the unique feature of the two springs normally maintaining the plunger in the neutral position where the valve means is closed. The total plunger movement and resultant movement of valve parts are limited by the distance of travel of the piston within the dampener chamber. The "time to travel" motion of the plunger for actuating the valve means is controlled by the viscous fluid moving from one side of the piston to the other side. By eliminating the fluid, the piston can merely act as a stop to create a no delay valve.

This invention also is made up of elements which can be easily assembled because of the two-part construction of the elongated valve body. One part contains a body insert which forms the cylinder for the dump piston and also the valve seat for the valve means. This part also contains the other valve elements, all of which will be described hereinafter. The other part contains the actuator mechanism and the self-contained dampener along with a major portion of the plunger. In assembling this leveling valve, the actuating mechanism, the dampener and the plunger are assembled in one part with the plunger extending therefrom. The body insert, the dump piston and the valve means are all assembled in the other part. The two parts are then connected together with the end of the plunger extending through the insert and engaging the valve element which it controls.

This symmetrical design of the valve has the added advantage of being mounted on either side of a frame member without special brackets.

Having briefly described the novel and unique features of my invention, reference is now made to the drawings and the following description made in conjunction with the drawings.

BRIEF DESCRIPTION OF THE DRAWINGS

FIG. 5 is a cross-sectional view of one end of the valve of this invention taken along the plane V—V of FIG. 2;

FIG. 6 is an exploded view of the various components contained within the valve housing;

FIG. 7 is a cross-sectional view of the port end of the valve of this invention illustrating one position of the valve means as actuated by the dump piston;

FIG. 8 is another side cross-sectional view of the port end of the valve illustrating the position of the valve means during which air is being delivered to the air spring;

FIG. 9 is an end-elevational view of one of the ends of the dampener; and

FIG. 10 is a cross-sectional view taken along the plane X—X of FIG. 9.

DESCRIPTION OF THE PREFERRED EMBODIMENT

Figure 1:
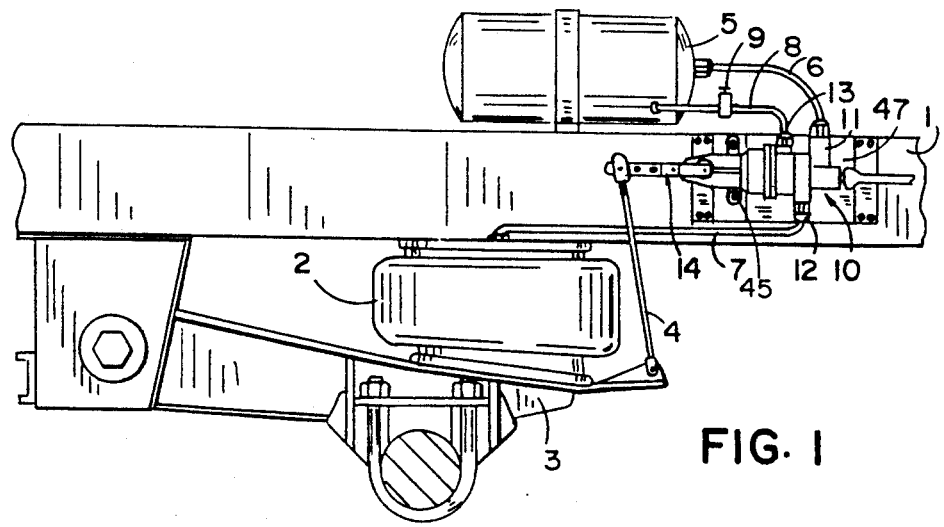
FIG. 1 is a side-elevational view of a schematic illustrating the leveling valve of this invention utilized in conjunction with an air spring for a vehicle.
Figure 2:
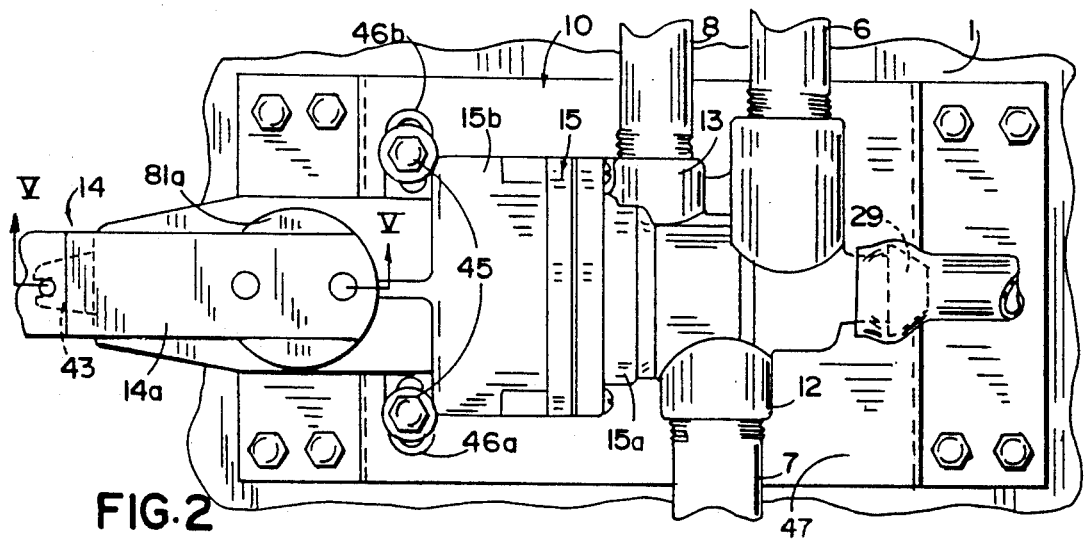
FIG. 2 is an enlarged, side-elevational view of the leveling valve of this invention.
Figure 3:
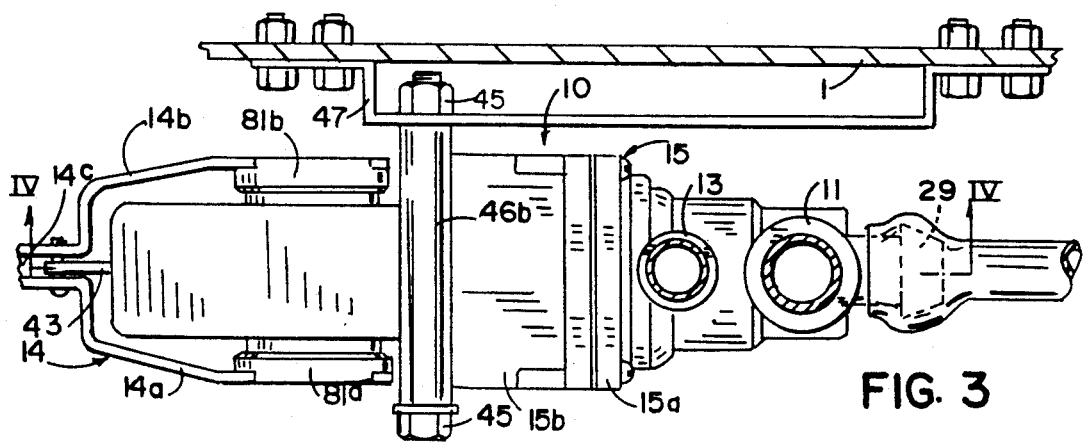
FIG. 3 is a top plan view of the valve disclosed in FIGS. 1 and 2.

Referring to the drawings, FIGS. 1, 2 and 3 disclose the leveling valve 10 mounted on the frame 1 of a vehicle by the bolts 45 extending through the openings in flanges 46a and 46b and attached to bracket 47. Valve 10 is adapted to supply air to the air spring 2 which is mounted between the frame 1 and the axle support 3. A linkage 4 adjustable on arm 14 is shown connected between the valve 10 and the axle support 3 so that when a load is placed on or removed from the vehicle, causing the frame 1 to move downwardly or upwardly, respectively, the leveling valve 10 will be actuated to either deliver or exhaust air from the air spring 2.

Air is supplied from a source of air pressure such as the tank 5 by the supply tube 6 connected to an inlet port 11. The air is delivered to the air spring 2 through the delivery tube 7 which is connected to the delivery port 12. Should it be desirable to exhaust all of the air from the air spring 2, a dumping means is provided in the valve 10, as will be explained hereinafter. The dumping valve is actuated by air introduced into the leveling valve 10 through dump pilot tube 8 which includes a manually operated valve 9. When the valve 9 is opened, air from the tank 5 passes through the tube 8 which is connected to the dump pilot port 13. As disclosed in FIG. 1, the normal operation of the leveling valve 10 is controlled by the actuator arm 14 to which the linkage 4 is connected.

Figure 4:
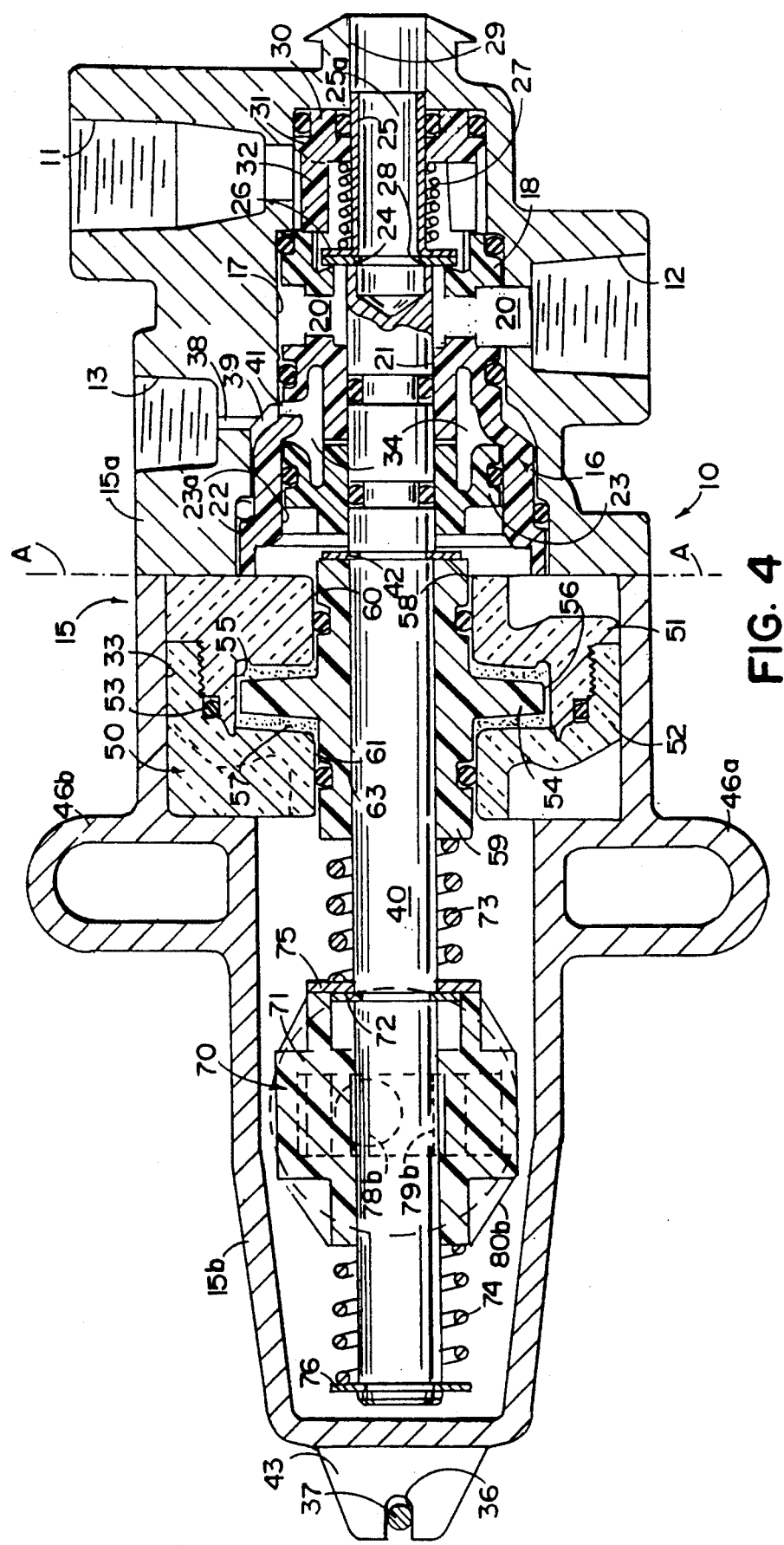
FIG. 4 is a cross-sectional view of the valve of FIGS. 1, 2 and 3, taken along the plane IV—IV of FIG. 3.

Referring now to FIGS. 4, 5 and 6, the details of the various components of the leveling valve are disclosed. FIG. 4 discloses the leveling valve 10 constructed of an elongated body 15 constructed of two molded zinc body parts 15a and 15b. Located within the cavity portion 17 of body part 15a is a body insert 16 injection molded of an acetal plastic. Cavity 17 of body part 15a is configured to receive the body insert 16 which has a necked-down portion 18 (FIGS. 4 and 6) in which is formed the valve seat 19 (FIGS. 4, 7 and 8) and the openings and cavity 20 which surrounds the plunger 40 to supply air to delivery port 7. Plunger 40 is constructed of steel and extends through bore 21 extending longitudinally through the body insert 16. The insert 16 also includes a flared portion 22 which provides a piston cylinder 23a in which a nylon dump piston 23 is located. As disclosed by FIG. 4, a plurality of sealing rings (unnumbered) are provided on the exterior of the insert body to seal the body insert 16 within the cavity 17 of the body part 15a.

Also located in the body part 15a to the right of the insert 16 is the flexible valve element 24 bonded to the flared end of metal stem 25. Valve element 24 has a sealing surface which in the neutral position of the valve is seated on the valve seat 19 by means of the metal stem 25 and flared end 26 against which the coil spring 27 exerts a bias to normally hold the flexible element 24 on the valve seat 19. It should be observed that the valve element 24 has an opening 28 therein and stem 25 has an opening 25a extending therethrough which, as will be explained hereinafter, provides an opening for exhausting air from the air spring through the exhaust port 29. An exhaust seal member 30 (FIGS. 4, 6, 7 and 8), having the sealing wall 31 and the circumferentially spaced arms 32 which abut against the end of the body insert 16, provides an exhaust seal. Seal member 30 is also made of acetal. Stem 25, in addition to backing up the flexible valve element 24, isolates the exhaust port 29 from the inlet port 11.

It should be understood that the above description of the body part 15a, with the components located therein, is a separate subassembly; that is, all of the elements described above except for the plunger 40 are assembled in the body part 15a separately from the components which will now be described as assembled in the body part 15b.

Assembled in and on the body part 15b, separate from the assembly as previously described, and before the two parts are mated together, are the dampener subassembly 50, the actuating mechanism 70 and a major portion of plunger 40. A minor portion of plunger 40 extends outwardly of the body part 15b and, as will be explained, is eventually inserted and extends to valve element 24 through insert 16 of the assembled part 15a for actuating valve element 24 as disclosed in FIGS. 4, 7 and 8, all of which will be described hereinafter.

The body part 15b has an enlarged cavity portion 33 (FIG. 4) in which the dampener subassembly 50 is located and held when assembled. This dampener subassembly is constructed of two parts. One part is the cylinder 51 to which is threadedly attached the cap 52. A sealing ring 53 is provided to seal the connection between the two parts. A nylon piston 54 is located within the cylinder wall 55 of cylinder 51. This piston 54 has an outer circumference 56 of lesser diameter than the cylinder wall 55 so that a viscous fluid 57 located in the cavity of the cylinder can pass through the space between the cylinder wall 55 and the outer circumference 56 of the piston 54. The piston 54 includes two hubs 58, 59 extending axially therefrom through the bores 60, 61 of the cylinder 51 and cap 52, respectively. Seals (unnumbered) between hubs 58, 59 and bores 60, 61 are provided to seal the surfaces between these parts. As disclosed in FIGS. 4 and 6, the piston 54 and its hubs 58, 59 have a bore extending therethrough and receiving the plunger 40.

It should be evident that the dampener subassembly 50 is a self-contained unit. Cylinder 51 and cap 52 are molded of a transparent polycarbonate so that one can see through them to determine the amount of dampening fluid inside the cavity and whether there are any air bubbles. The viscous dampening fluid 57 is introduced into the cavity of the cylinder 51 before assembly of the cap 52 and with the piston 54 in place against the end of the cylinder. When cylinder 51 and cap 52 are screwed together any air trapped in the cavity is permitted to escape through a small opening 62 (FIGS. 9 and 10) in the face of the cap 52. After the two parts are screwed together and it is determined the viscous fluid has completely filled the cavity on each side of the piston 54, as viewed through the transparent cylinder 51 and cap 52, the opening 62 is closed by any suitable means such as by heat sealing or inserting a plug 62a.

Also located in the body part 15b is the actuating mechanism 70 which actuates plunger 40 which in turn controls the valve means in the body part 15a. Actuating mechanism 70 includes a sleeve 71 constructed of acetal and slidably mounted on plunger 40 in either direction from the neutral position. Sleeve 71 is held on the plunger 40 by the snap-rings 72 and 76, springs 73 and 74 and washer 75. Spring 73 is mounted circumferentially around plunger 40 and abuts against a washer 75 and the hub 59 of the piston 54. Washer 75 abuts against the snap-ring 72. Spring 74 abuts against the other end of the sleeve 71 and another snap-ring 76 is located at the extreme left-hand end of plunger 40 as viewed in FIGS. 4 and 5. Spring 73 is a larger spring than the spring 74 and thus has a greater biasing force so that the springs hold the plunger 40 in a neutral position against snap-ring 72, as viewed in FIG. 4 where the flexible valve element 24 is seated on the valve seat 19 and plunger 40 to close off all communication between the ports 11, 12 and 29.

Within a broader aspect of this invention, the plunger 40 can be held in the neutral position by springs of equal force in which event snap-ring 72 is eliminated and the springs exert equal forces on each end of sleeve 71.

Sleeve 71 is actuated in both axial directions toward and away from flexible valve element 24 by eccentrically actuated dogs 77a and 77b (FIGS. 5 and 6) mounted on each side of the sleeve 71. The dogs 77a and 77b each have a cylindrical pin portion 78a and 78b, respectively, and a rectangular cam portion 79a and 79b. The cam portions 79a and 79b extend into the slots 80a and 80b, respectively, on opposite sides of the sleeve and are adapted to slide in the slots 80a and 80b. The cylindrical pin portions 78a and 78b extend into the apertures 82a and 82b of the bearing drives 81a and 81b, respectively. The apertures 82a and 82b are offset from the axis of rotation of the bearing drives 81a and 81b to provide an eccentric drive. As a result, the rotation of the bearing drives 81a and 81b causes the sleeve to move either to the right or left, depending upon the direction of rotation.

Actuating arm 14 is connected to both of the bearing drives 81a and 81b by means of the forked construction thereof comprising the arms 14a and 14b which are staked to the bearing guides 81a and 81b, respectively, as best disclosed in FIG. 5. The two arms 14a and 14b merge and are connected to form a single arm 14c which is that portion of the actuator arm 14 that is adjustably connected to the linkage 4, as disclosed in FIG. 1.

The plunger 40 is operatively connected to the sleeve 71, as above disclosed, and extends through the bore 63 in the piston 54 and its hubs 58 and 59. Immediately adjacent the hub 58, a snap-ring 42 is secured in the groove of the plunger 40.

A flange 43 with a groove 36 extends from the extreme left end of body part 15b as viewed in FIGS. 3, 4 and 5. This flange is provided for establishing the neutral position of valve mechanism 70 by aligning the openings 35a and 35b in the arms 14a and 14b with the groove 36 and inserting a pin 37 therethrough. The purpose of this arrangement will be explained hereinafter under "Operation."

As previously discussed, the assembly of the components in the body parts 15a and 15b is accomplished prior to the final assembly of the entire valve, as disclosed in FIG. 4. In other words, the assembly of the components in each of the parts 15a and 15b, as previously described, results in the two assemblies being separate and apart along the plane A except for a small portion of the hub 58 and a minor portion of the plunger 40 which extends from the assembly of part 15b along with snap-ring 42. Having completed the assembly of the two body parts 15a and 15b, the two are then mated together to the position as disclosed in FIG. 4. In connecting the two assembled parts together, plunger 40 is inserted through the body insert 16 to the flexible valve element 24 as disclosed in FIG. 4, which is the neutral position of the valve where there is no communication between any of the ports 11, 12 and 29.

OPERATION

Having disclosed the construction of the leveling valve of this invention and how it is assembled, the operation will now be described in relation to its operation on a vehicle as schematically disclosed in FIG. 1. The valve 10 is in neutral position when the openings 35a and 35b of arm 14 are in alignment with the groove 36 (FIG. 4) and the end of the body part 15b. In this position, the pin 37 is extended through the openings 35a and 35b and groove 36. In such position, the valve is in its neutral condition with the flexible valve element 24 seated against the valve seat 19 and the extreme end of plunger 40 engaging the valve element 24. In this position, there is no communication between inlet port 11, delivery port 12 and exhaust port 29 so that there is no flow of air through the valve. Assuming that the desired relative position of the frame 1 and axle support 3 is as shown in FIG. 1, the linkage 4 is attached to arm 14c of actuator arm 14 and is adjustable on such arm 14c so that in this position, as shown, the actuating arm will remain in the same position when the pin 37 is withdrawn and no air will be flowing through valve 10 in or out of the air spring 2.

Now assuming that a load is placed on the frame 1 which changes the distance between frame 1 and axle support 3, the actuator arm 14 is forced upwardly and the two arms 14a and 14b rotate the bearing drives 81a and 81b. This causes the sleeve 71 to be moved toward the right, as viewed in FIG. 4, against the bias of spring 73 which is sufficiently strong to transmit a force on hub 59 which, in turn, is transmitted through piston 54 to hub 58 which abuts against snap-ring 42 causing plunger 40 to unseat flexible valve element 24. As disclosed in FIG. 8, unseating flexible valve element 24 opens communication between the inlet port 11 and the delivery port 12 through the cavity 20 which delivers pressured air to the air spring causing it to lift the frame 1 until the original position, as disclosed in FIG. 1, is reached, at which time the plunger is withdrawn to the neutral position as shown in FIG. 4 and flexible valve element 24 again seats on the seat 19 to close off all communication between the ports.

During this operation, there is a time delay or "time to travel" created by the dampener 50 which when the piston moves in a direction to the right, the viscous fluid 57 within the cylinder cavity flows through the space between the circumference 56 of the piston and the cylindrical wall 55 of the cylinder 51. This dampening means provides the desired delay so that actuation of the actuator arm caused by sudden movement of the axle support 3 relative to frame 1 will not immediately actuate the valves. Thus, undesirable fluctuations are eliminated by this device. In addition, springs 73 and 74 assist in eliminating many of these undesirable fluctuations and provide a means for returning the plunger 40 to the neutral position by virtue of the spring 73 being stronger than spring 74 which maintains the same relative position of the plunger 40 and sleeve 71. This can also be accomplished by springs that are equal in strength.

Dampener 50 also limits movement of plunger 40 and the valve parts. The total plunger movement inside the valve is 0.060 inch in either direction. This limits the seal wear of all the seals provided in the valve. This limiting of the travel of plunger 40 in combination with the biased sliding sleeve 71, provides a unique means for accommodating any over-travel of the actuating mechanism 70. In other words, when a limit of travel is reached by reason of piston 54 being pushed all the way to one of the walls of the dampener, the sleeve 71 can nevertheless continue to slide against the bias of the springs to take up or accommodate the over-travel of arm 14 and rotation of mechanism 70.

Assuming that a load is taken off from frame 1, air spring 2 will cause the distance between frame 1 and axle support 3 to increase. In this event, the arm actuator 14 is pulled downwardly causing the bearing drives 81a and 81b to rotate in a counterclockwise direction and the sleeve 71 to be actuated in a direction toward the left, as viewed in FIG. 4. When sleeve 71 is moved to the left, plunger 40 follows by virtue of the compression of spring 74 against snap-ring 76 attached to plunger 40. Dampening is accomplished by snap-ring 42 applying a force to hub 58 and piston 54 within dampener 50. Accordingly, the end of plunger 40 adjacent valve element 24 moves away from the valve element providing a space therebetween, as disclosed in FIG. 7, permitting the air in the air spring 2 to exhaust through opening 28 in the valve element 24 through the interior passageway 25a of the stem 25 and out through the exhaust port 29.

FIG. 7 illustrates the path of the air exhausting from the air spring 2 by reason of the withdrawal of plunger 40 away from the valve element 24 which results when the actuator mechanism withdraws the plunger to the position of FIG. 7. However, FIG. 7 discloses the withdrawal of plunger 40 by means of the dump piston 23. As disclosed in FIG. 4, the body insert 16 provides a cavity 34 behind the dump piston 23. Cavity 34 is in communication with the dump pilot port 13 through the passageway 38 in the wall of the body part 15a, through the space 39 between the body insert 16 and the inner wall of the body part 15a, and also through hole 41 in the body insert 16. Thus, pressurized air can be provided to the back of dump piston 23 by actuating valve 9 (FIG. 1) located in the dump pilot tube 8 which is connected to the dump pilot port 13. When the air is introduced to the back of the piston 23, it is pushed to the left as viewed in FIGS. 4 and 7 so as to engage snap-ring 42 and actuate plunger 40 in a direction to the left as viewed in FIGS. 4 and 7, thus moving the end of plunger 40 away from the flexible valve element 24 as shown in FIG. 7. This dumping action by piston 23 is made possible by compressing spring 73 allowing sleeve 71 to retain the position established by the eccentric position of bearing drives 81a, 81b and dogs 79a, 79b as actuator arm 14 rises during the dumping of the air in air spring 2. Accordingly at any time when desired the air spring can be exhausted of air by opening valve 9, all of this being accomplished primarily within the one leveling valve unit 10.

Having described my invention, it will become evident that all of the problems which it has solved and the advantages it has, as enumerated above, are made possible by the novel and unique construction of my leveling valve.

Although I have disclosed the preferred embodiments thereof, it should be evident that various changes and modifications can be made in the invention as would be apparent to those skilled in the art without departing from the spirit and scope of my invention. It is intended that the invention is to be limited only by the scope of the appended claims and all equivalents thereof.

The embodiments of the invention in which an exclusive property or privilege is claimed are defined as follows.

1. A dampener for dampening the movement of an actuating means comprising:
a body formed of two transparent parts secured together about a central axis and having sidewall means and end walls forming an inner chamber surrounding said axis, said end walls being spaced from each other along said axis;
a dampening piston located in said chamber and movable between said end walls along said sidewall means and central axis;
elongated means extending entirely through and from at least one end wall of said body and adapted to be slidably connected to said piston during operation of the dampener and operatively connected to an actuating means;
said dampening piston having oppositely directed faces spaced a distance along said axis less than the said space between the end walls of said chamber providing sufficient spaces between said end walls and faces for containing a viscous fluid in said spaces between said faces of said dampening piston and said end walls of said chamber;
means provided to pass metered amounts of said viscous fluid from one face to the other of said dampening piston as said dampening piston slides longitudinally in said chamber, said parts being sufficiently transparent to observe the amount of viscous fluid in said chamber and whether said viscous fluid contains any air bubbles.

2. A dampener for dampening the movement of an actuating means comprising:
a body having sidewalls and end walls and a central axis; said side walls forming an inner chamber surrounding said axis and said end walls being spaced from each other along said axis;
a dampening piston located in said chamber and movable between said end walls along said sidewalls and central axis of said body, said piston and said end walls of said body having aligned, centrally located bores located on said axis;
elongated means extending entirely through said bores of said piston and said end walls during operation of the dampener and slidable in said bores of said piston and body end walls;
at least one hub extending from one face of said piston through at least a bore of one of said end walls of said body along said central axis, said hub being exposed so as to be engaged by an actuator means;
said dampening piston having oppositely directed faces spaced a distance along said axis less than the space between the end walls of said chamber providing sufficient spaces between each of said end walls and faces for containing a viscous fluid in said spaces between said faces of said dampening piston and said end walls of said chamber; and
means provided to pass metered amounts of said viscous fluid from one face to the other of said dampening piston as said dampening piston slides longitudinally in said chamber.

3. The dampener for a leveling valve of claim 2 in which the dampening piston includes a second hub extending from the other face of said piston and through the bore of the other of said end walls of said body along said central axis, said second hub being exposed so as to be engaged by an actuator means.

4. The dampener of claim 3 including:
actuating means; and
means for operatively connecting said actuating means to said piston and hubs whereby when an actuating mechanism moves said piston, said actuating means simultaneously moves said elongated means while said piston displaces said viscous fluid to thereby function as a dampener.

5. The dampener of claim 2 including:
means for operatively connecting said elongated means to said piston and hub whereby when an actuating mechanism moves said piston, said actuating means simultaneously moves said elongated means while said piston displaces said viscous fluid to thereby function as a dampener.

6. A dampener for dampening the movement of an actuating means comprising:
a body having sidewalls and end walls and a central axis; said side walls forming an inner chamber surrounding said axis and said end walls being spaced from each other along said axis;
a dampening piston located in said chamber and movable between said end walls along said sidewalls and central axis of said body, said piston and said end walls of said body having aligned, centrally located bores located on said axis;
elongated means extending entirely through said bores of said piston and said end walls and slidable in said bores of said piston and body end walls;
said dampening piston having oppositely directed faces spaced a distance along said axis less than the space between the end walls of said chamber providing sufficient spaces between each of said end walls and faces for containing a viscous fluid in said spaces between said faces of said dampening piston and said end walls of said chamber;
means provided to pass metered amounts of said viscous fluid from one face to the other of said dampening piston as said dampening piston slides longitudinally in said chamber.
actuating means; and
means for operatively connecting said actuating means to said piston whereby when said actuating means moves said piston, said piston simultaneously moves said elongated means while said piston displaces said viscous fluid to thereby function as a dampener.

7. A dampener comprising:
a body having sidewall means and two ends with a central axis; an inner chamber surrounding said axis and having end walls spaced from each other along said axis, one of said end walls having a bore extending therethrough;
a dampening piston located in said chamber and movable between said end walls along said central axes of said body;
elongated means operatively connected to said piston and extending from at least one face of said piston, said piston adapted to be operatively connected to an actuating means of a device to be dampened;
said dampening piston having oppositely directed faces spaced a distance along said axis less than the said space between said ends of said chamber providing sufficient spaces between said end walls and faces for containing a viscous fluid between said faces of said dampening piston and said end walls of said chamber;

said piston having at least one hub extending from one face of said piston along said longitudinal axis, said hub extending through said bore in said one end of said body and thereby being exposed so as to be engaged by an actuating means;

coiled spring means having a first coil spring engaging said hub and a second coil spring operatively connected to said elongated means for providing biasing means for biasing said piston to a neutral position between the end walls of said chamber and for moving said piston by a force exerted on said first coil spring; and means provided to pass metered amounts of said viscous fluid from one face to the other of said dampening piston as said dampening piston slides longitudinally in said chamber.

8. The dampener of claim 7 in which said piston includes hubs extending from both faces thereof and includes bores extending axially through the said piston and said hubs, said bore slidably receiving said elongated means; and means for operatively connecting said elongated means to said piston and hubs whereby when an actuating means applies a force on said first coil spring and moves said piston, said piston simultaneously moves said elongated means while said piston displaces said viscous fluid to thereby function as a dampener.

9. The dampener of claim 8 in which said means for operatively connecting said elongated means to said piston includes said coiled spring means engaging said one hub and a member radially extending from said elongated means and engaging the other of said hubs.

10. The dampener of claim 9 in which said parts are sufficiently transparent to determine the amount of viscous fluid in said chamber and whether any air bubbles are present in said fluid.

11. The dampener of claim 10 in which a small opening is provided in one of the parts of said body for permitting the escape of air from said chamber during the assembly of the dampener; and closure means for closing said small opening.

12. The dampener of claim 9 in which said parts are generally circular and include threaded means adjacent the periphery of said parts for connecting the parts together.

13. The dampener of claim 7 in which said body is formed of two end parts secured together at their peripheries, one of said parts forming a cylinder on which said dampening piston slides and the other part is a cap that closes said chamber so as to contain said viscous fluid.

* * * * *